United States Patent
Li et al.

(10) Patent No.: US 10,368,370 B2
(45) Date of Patent: Jul. 30, 2019

(54) MULTICHANNEL ACCESS METHOD AND APPARATUS

(71) Applicant: Huawei Technologies Co., Ltd., Shenzhen (CN)

(72) Inventors: Yunbo Li, Shenzhen (CN); Zhou Lan, Shenzhen (CN); Yanchun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 15/473,357

(22) Filed: Mar. 29, 2017

(65) Prior Publication Data
US 2017/0208626 A1    Jul. 20, 2017

Related U.S. Application Data

(63) Continuation of application No. PCT/CN2014/087984, filed on Sep. 30, 2014.

(51) Int. Cl.
*H04W 74/08* (2009.01)
*H04W 84/12* (2009.01)

(52) U.S. Cl.
CPC ....... *H04W 74/0808* (2013.01); *H04W 74/08* (2013.01); *H04W 84/12* (2013.01)

(58) Field of Classification Search
CPC .. H04W 74/08; H04W 74/0808; H04W 84/12
See application file for complete search history.

(56) References Cited

U.S. PATENT DOCUMENTS

2008/0130591 A1   6/2008   Kwon
2009/0052463 A1   2/2009   Chen et al.
(Continued)

FOREIGN PATENT DOCUMENTS

CN   101193066 A    6/2008
CN   101855935 A    10/2010
(Continued)

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications." IEEE Computer Society, IEEE Std 802.11-2012, Institute of Electrical and Electronics Engineers, New York, New York (Mar. 29, 2012).
(Continued)

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

Embodiments of the present application disclose a multichannel access method, including: obtaining a transmission opportunity TXOP of a first reserved channel; sensing a non-reserved channel other than the first reserved channel in a preset time segment in the TXOP, and if the non-reserved channel is in an idle state, using the non-reserved channel as a second reserved channel; and when an ending moment of the preset time segment is reached, sending a current data frame on the first reserved channel and the second reserved channel. Correspondingly, the embodiments of the present application further disclose a multichannel access apparatus. Channel utilization can be improved by implementing the embodiments of the present application.

8 Claims, 7 Drawing Sheets

(56) References Cited

U.S. PATENT DOCUMENTS

| | | | |
|---|---|---|---|
| 2012/0026997 A1 | 2/2012 | Seok et al. | |
| 2012/0182886 A1 | 7/2012 | Ong et al. | |
| 2013/0051256 A1 | 2/2013 | Ong et al. | |
| 2013/0230038 A1 | 9/2013 | Walton et al. | |
| 2014/0010145 A1 | 1/2014 | Liu et al. | |
| 2014/0079016 A1 | 3/2014 | Dai et al. | |
| 2014/0079046 A1 | 3/2014 | Yang et al. | |
| 2014/0092860 A1* | 4/2014 | Kneckt | H04W 72/1205 370/329 |
| 2015/0373741 A1* | 12/2015 | Yerramalli | H04W 74/0808 370/336 |

FOREIGN PATENT DOCUMENTS

| | | |
|---|---|---|
| CN | 102958185 A | 3/2013 |
| CN | 103299698 A | 9/2013 |
| JP | 2013533680 A | 8/2013 |
| JP | 2014502453 A | 1/2014 |

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Computer Society, IEEE Std 802.11ac-2013, Institute of Electrical and Electronics Engineers, New York, New York (2013).

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n-2009, Institute of Electrical and Electronics Engineers, New York, New York (Oct. 29, 2009).

CN201480081538.8, Office Action, dated Mar. 25, 2019.

* cited by examiner

MULTICHANNEL ACCESS METHOD AND APPARATUS

CROSS-REFERENCE TO RELATED APPLICATIONS

This application is a continuation of International Application No. PCT/CN2014/087984, filed on Sep. 30, 2014, the disclosure of which is hereby incorporated by reference in its entirety.

TECHNICAL FIELD

Embodiments of the present application relates to the communications field, and in particular, to a multichannel access method and apparatus.

BACKGROUND

With rapid evolution of a wireless local access network (WLAN) standard, a WLAN system aggregates an increasingly high bandwidth, to obtain a higher transmission rate. In the WLAN standard, before transmitting data, a station generally reserves in advance a channel within a period of time. The reserved channel is used for subsequent data transmission of the station. A bandwidth of the reserved channel of the station determines an available bandwidth in an entire subsequent data transmission process.

In the prior art, a specific process of reserving a channel by a station is: when data transmission a peer device needs to be performed, sensing a primary channel, and when determining that the primary channel is an idle channel, triggering a backoff procedure, that is, starting a backoff counter, to generate a random number, thereby implementing the backoff procedure. Every time when an idle time of the channel reaches a timeslot, the backoff counter is decremented by 1. When the random number generated by the backoff counter is decreased to 0, a bandwidth of the channel is selected, and a reserved frame of the channel is sent on the selected channel. The reserved frame of the channel is used as a reservation for the channel, and data transmission to the peer device is performed on the reserved channel.

However, the solution of reserving a channel by a station in the prior art also has problems of low channel usage efficiency and a waste of channel resources.

SUMMARY

Embodiments of the present application provide a multichannel access method and apparatus, so as to resolve a problem of low channel utilization in the prior art.

To resolve the foregoing technical problem, a first aspect of the embodiments of the present application provides a multichannel access method, including:

obtaining a transmission opportunity TXOP of a first reserved channel;

sensing a non-reserved channel other than the first reserved channel in a preset time segment in the TXOP, and if the non-reserved channel is in an idle state, using the non-reserved channel as a second reserved channel; and when an ending moment of the preset time segment is reached, sending a current data frame on the first reserved channel and the second reserved channel.

With reference to the first aspect, in a first possible implementation manner, the obtaining a TXOP of a first reserved channel includes:

when it is sensed that the first reserved channel is in an idle state, triggering a backoff procedure, and after it is detected that the backoff procedure ends, determining the TXOP of the first reserved channel; or receiving the TXOP, which is sent by a peer device, of the first reserved channel, where the TXOP of the first reserved channel is determined by the peer device.

With referent to the first aspect or the first possible implementation manner, in a second possible implementation manner, before the sensing a non-reserved channel other than the first reserved channel in a preset time segment in the TXOP, the method further includes:

calculating a sending moment of the current data frame in the TXOP, and using the calculated sending moment as the ending moment of the preset time segment.

With reference to the second possible implementation manner of the first aspect, in a third possible implementation manner, the calculating a sending moment of the current data frame in the TXOP includes:

determining the sending moment of the current data frame according to a start moment of a previous data frame of the current data frame, duration of the previous data frame, and an interframe space between the previous data frame and the current data frame; or determining the sending moment of the current data frame according to an ending moment of a previous data frame of the current data frame, and an interframe space between the previous data frame and the current data frame.

With reference to the third possible implementation manner of the first aspect, in a fourth possible implementation manner, the method further includes:

determining whether the interframe space between the current data frame and the previous data frame is less than a time length of the preset time segment, and if yes, adjusting the interframe space between the current data frame and the previous data frame, so that the adjusted interframe space is greater than or equal to the time length of the preset time segment.

With reference to the third possible implementation manner of the first aspect, in a fifth possible implementation manner, the method further includes:

receiving an indication message sent by the peer device, where the indication message includes a target time length; and adjusting the interframe space between the current data frame and the previous data frame to the target time length according to the indication message, where the target time length is greater than or equal to a time length of the preset time segment.

With reference to any one of the first aspect to the fifth possible implementation manner, in a sixth possible implementation manner, the time length of the preset time segment is equal to a point coordination function interframe space PIFS, a distributed coordination function interframe space DIFS, an arbitration interframe space AIFS, or a short interframe space SIFS.

A second aspect of the embodiments of the present application provides a multichannel access apparatus, including:

an obtaining module, configured to obtain a transmission opportunity TXOP of a first reserved channel;

an extension module, configured to: sense a non-reserved channel other than the first reserved channel in a preset time segment in the TXOP, and if the non-reserved channel is in an idle state, use the non-reserved channel as a second reserved channel; and a sending module, configured to: when an ending moment of the preset time segment is reached, send a current data frame on the first reserved channel and the second reserved channel.

With reference to the second aspect, in a first possible implementation manner, the obtaining module is configured to:

when it is sensed that the first reserved channel is in an idle state, trigger a backoff procedure, and after it is detected that the backoff procedure ends, determine the TXOP of the first reserved channel; or receive the TXOP, which is sent by a peer device, of the first reserved channel, where the TXOP of the first reserved channel is determined by the peer device.

With reference to the second aspect or the first possible implementation manner, in a second possible implementation manner, the apparatus further includes:

a calculation module, configured to: calculate a sending moment of the current data frame in the TXOP, and use the calculated sending moment as the ending moment of the preset time segment.

With reference to the second possible implementation manner of the second aspect, in a third possible implementation manner, the calculation module is configured to:

determine the sending moment of the current data frame according to a start moment of a previous data frame of the current data frame, duration of the previous data frame, and an interframe space between the previous data frame and the current data frame; or determine the sending moment of the current data frame according to an ending moment of a previous data frame of the current data frame, and an interframe space between the previous data frame and the current data frame.

With reference to the third possible implementation manner of the second aspect, in a fourth possible implementation manner, the apparatus further includes:

a first adjustment module, configured to: determine whether the interframe space between the current data frame and the previous data frame is less than a time length of the preset time segment, and if yes, adjust the interframe space between the current data frame and the previous data frame, so that the adjusted interframe space is greater than or equal to the time length of the preset time segment.

With reference to the third possible implementation manner of the second aspect, in a fourth possible implementation manner, the apparatus further includes:

a second adjustment module, configured to: receive an indication message sent by the peer device, where the indication message includes a target time length; and adjust the interframe space between the current data frame and the previous data frame to the target time length according to the indication message, where the target time length is greater than or equal to a time length of the preset time segment.

With reference to any one of the second aspect to the fifth possible implementation manner, in a sixth possible implementation manner, the time length of the preset time segment is equal to a point coordination function interframe space PIFS, a distributed coordination function interframe space DIFS, an arbitration interframe space AIFS, or a short interframe space SIFS.

A third aspect of the embodiments of the present application the provides a multichannel access apparatus, including a processor and a memory, where the memory stores program code, and the processor invokes the program code stored in the memory to execute the following operations:

obtaining a transmission opportunity TXOP of a first reserved channel;

sensing a non-reserved channel other than the first reserved channel in a preset time segment in the TXOP, and if the non-reserved channel is in an idle state, using the non-reserved channel as a second reserved channel; and when an ending moment of the preset time segment is reached, sending a current data frame on the first reserved channel and the second reserved channel.

With reference to the third aspect, in a first possible implementation manner, the obtaining, by the processor, a transmission opportunity TXOP of a first reserved channel includes:

when it is sensed that the first reserved channel is in an idle state, triggering a backoff procedure, and after it is detected that the backoff procedure ends, determining the TXOP of the first reserved channel; or receiving the TXOP, which is sent by a peer device, of the first reserved channel, where the TXOP of the first reserved channel is determined by the peer device.

With reference to the third aspect or the first possible implementation manner, in a second possible implementation manner, the processor is further configured to:

calculate a sending moment of the current data frame in the TXOP, and use the calculated sending moment as the ending moment of the preset time segment.

With reference to the second possible implementation manner of the third aspect, in a third possible implementation manner, the calculating, by the processor, a sending moment of the current data frame in the TXOP includes:

determining the sending moment of the current data frame according to a start moment of a previous data frame of the current data frame, duration of the previous data frame, and an interframe space between the previous data frame and the current data frame; or determining the sending moment of the current data frame according to an ending moment of a previous data frame of the current data frame, and an interframe space between the previous data frame and the current data frame.

With reference to the third possible implementation manner of the third aspect, in a fourth possible implementation manner, the processor is further configured to:

determine whether the interframe space between the current data frame and the previous data frame is less than a time length of the preset time segment, and if yes, adjust the interframe space between the current data frame and the previous data frame, so that the adjusted interframe space is greater than or equal to the time length of the preset time segment.

With reference to the third possible implementation manner of the third aspect, in a fifth possible implementation manner, the processor is further configured to:

receive an indication message sent by the peer device, where the indication message includes a target time length; and adjust the interframe space between the current data frame and the previous data frame to the target time length according to the indication message, where the target time length is greater than or equal to a time length of the preset time segment.

With reference to the third aspect to the fifth possible implementation manner, in a sixth possible implementation manner, the time length of the preset time segment is equal to a point coordination function interframe space PIFS, a distributed coordination function interframe space DIFS, an arbitration interframe space AIFS, or a short interframe space SIFS.

A fourth aspect of the embodiments of the present application provides a multichannel access method, including:

obtaining a transmission opportunity TXOP of a reserved channel;

sensing a non-reserved channel in the TXOP; and when data transmission is initiated, if there exists a non-reserved channel that is continuously idle in a preset time segment, performing the data transmission by using the reserved channel and the non-reserved channel, where the preset time segment ends at an initiation moment of the data transmission, and duration of the preset time segment is preset duration.

With reference to the fourth aspect, in a first possible implementation manner, the sensing a non-reserved channel in the TXOP is specifically sensing the non-reserved channel in the preset time segment.

With reference to the fourth aspect or the first possible implementation manner, in a second possible implementation manner, the initiation moment of the data transmission is an ending moment of a transmission gap after the end of previous data transmission of the data transmission.

With reference to the third aspect or the first or the second possible implementation manner, in a third possible implementation manner, duration of the transmission gap is greater than or equal to the preset duration.

A fifth aspect of the embodiments of the present application provides a multichannel access apparatus, including:

an obtaining module, configured to obtain a transmission opportunity TXOP of a reserved channel;

an extension module, configured to sense a non-reserved channel in the TXOP; and a sending module, configured to: when data transmission is initiated, if it is determined that there exists a non-reserved channel that is continuously idle in a preset time segment, perform the data transmission by using the reserved channel and the non-reserved channel, where the preset time segment ends at an initiation moment of the data transmission, and duration of the preset time segment is preset duration.

With reference to the fifth aspect, in a first possible implementation manner, the extension module is specifically configured to sense the non-reserved channel in the preset time segment.

With reference to the fifth aspect or the first possible implementation manner, in a second possible implementation manner, the initiation moment of the data transmission is an ending moment of a transmission gap after the end of previous data transmission of the data transmission.

With reference to the fifth aspect or the first or the second possible implementation manner, in a third possible implementation manner, duration of the transmission gap is greater than or equal to the preset duration.

A sixth aspect of the embodiments of the present application provides a multichannel access apparatus, including a processor and a memory, where the memory stores program code, and the processor invokes the program code stored in the memory to execute the following operations:

obtaining a transmission opportunity TXOP of a reserved channel;

sensing a non-reserved channel in the TXOP; and when data transmission is initiated, if there exists a non-reserved channel that is continuously idle in a preset time segment, performing the data transmission by using the reserved channel and the non-reserved channel, where the preset time segment ends at an initiation moment of the data transmission, and duration of the preset time segment is preset duration.

With reference to the sixth aspect, in a first possible implementation manner, the sensing a non-reserved channel in the TXOP is specifically sensing the non-reserved channel in the preset time segment.

With reference to the fifth aspect or the first possible implementation manner, in a second possible implementation manner, the initiation moment of the data transmission is an ending moment of a transmission gap after the end of previous data transmission of the data transmission.

With reference to the sixth aspect or the first or the second possible implementation manner, in a third possible implementation manner, duration of the transmission gap is greater than or equal to the preset duration.

When data transmission is initiated, if there exists a non-reserved channel that is continuously idle in a preset time segment, the data transmission is performed by using a reserved channel and a non-reserved channel. As can be seen, when the data transmission is performed, in addition to the reserved channel, the non-reserved channel may also be used, thereby effectively improving channel utilization.

Whether the non-reserved channel is in an idle state is sensed in a preset time segment before a current data frame is sent on a first reserved channel. If yes, the sensed non-reserved channel in the idle state is used as a second reserved channel, and the current data frame is sent by using the first reserved channel and the second reserved channel. It is implemented that based on some reserved channels, new idle channels are continuously reserved in a data transmission process, and data transmission is performed by using a reserved channel and a newly-reserved idle channel, so that channel usage efficiency is improved, and channel resources are fully used.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
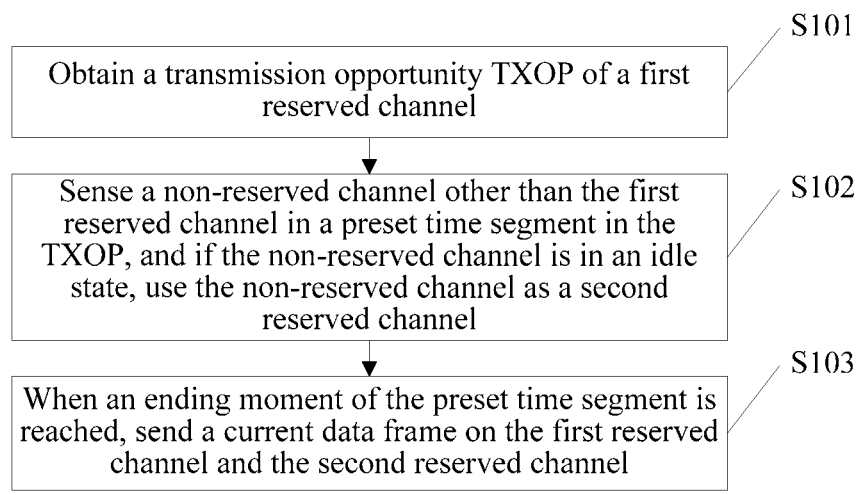
FIG. 1 is a schematic flowchart of a multichannel access method according to Embodiment 1 of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

In addition, aspects or features of the present application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a CD Compact Disk), a DVD (Digital Versatile Disk), a smart card and a flash memory component (for example, EPROM (Erasable Programmable Read-Only Memory), a card, a stick, or a key drive). In addition, various storage media described in this specification may indicate one or more devices and/or other machine-readable media that is used to store information. The term "machine-readable media" may include but is not limited to a radio channel, and various other media that can store, contain and/or carry an instruction and/or data.

A reserved channel and a non-reserved channel involved in the embodiments of the present application may be unlicensed spectrum channels, for example, a Wi-Fi communications standard channel, a Bluetooth communications standard channel, or an infrared communications standard channel. For an unlicensed spectrum channel, before transmitting data by using the unlicensed spectrum channel, a terminal device obtains, by means of contention, a right to use the unlicensed spectrum channel.

In the prior art, when a station reserves a reserved channel, a bandwidth of the channel is determined once and for all. In a process in which the station performs data transmission, the station can use only the reserved channel to transmit data. Even if a non-reserved idle channel exists, the station cannot use the non-reserved idle channel. Consequently, channel usage efficiency is decreased, and channel resources are wasted.

To resolve the foregoing problems, the embodiments of the present application provide a solution, in which data transmission may be performed by using a reserved channel and a non-reserved channel at the same time. Specifically, an embodiment of the present application provides a multichannel transmission method, including: obtaining a transmission opportunity TXOP of a reserved channel; sensing a non-reserved channel in the TXOP; and when data transmission is initiated, if there exists a non-reserved channel that is continuously idle in a preset time segment, performing the data transmission by using the reserved channel and the non-reserved channel, where the preset time segment ends at an initiation moment of the data transmission, and duration of the preset time segment is preset duration.

According to the technical solution provided in the embodiments of the present application, when the data transmission is initiated, if there exists a non-reserved channel that is continuously idle in the preset time segment, the data transmission is performed by using the reserved channel and the non-reserved channel. As can be seen, when the data transmission is performed, in addition to the reserved channel, the non-reserved channel may also be used, thereby effectively improving channel utilization.

In a specific implementation process, non-reserved channel sensing may be continuously performed in the entire TXOP. Alternatively, non-reserved channel sensing may be performed merely in the preset time segment, that is, the sensing a non-reserved channel in the TXOP is specifically sensing the non-reserved channel in the preset time segment. A person skilled in the art should understand that the preset time segment is in the TXOP. In addition, the initiation moment of the data transmission is an ending moment of a transmission gap after the end of previous data transmission of the data transmission. In a specific implementation process, duration of the transmission gap may be set to be greater than or equal to the preset duration, that is, the duration of the transmission gap is greater than or equal to the preset duration. More specifically, when the previous data transmission is uplink transmission, the duration of the transmission gap is greater than or equal to the preset duration.

In addition, the present application further provides a multichannel access apparatus, including: an obtaining module, configured to obtain a transmission opportunity TXOP of a reserved channel; an extension module, configured to sense a non-reserved channel in the TXOP; and a sending module, configured to: when data transmission is initiated, if it is determined that there exists a non-reserved channel that is continuously idle in a preset time segment, perform the data transmission by using the reserved channel and the non-reserved channel, where the preset time segment ends at an initiation moment of the data transmission, and duration of the preset time segment is preset duration.

In a specific implementation process, non-reserved channel sensing may be continuously performed in the entire TXOP. Alternatively, non-reserved channel sensing may be performed merely in the preset time segment, that is, the extension module is specifically configured to sense the non-reserved channel in the preset time segment. A person skilled in the art should understand that the preset time segment is in the TXOP. In addition, the initiation moment of the data transmission is an ending moment of a transmission gap after the end of previous data transmission of the data transmission. In a specific implementation process, duration of the transmission gap may be set to be greater than or equal to the preset duration, that is, the duration of the transmission gap is greater than or equal to the preset duration. More specifically, when the previous data transmission is uplink transmission, the duration of the transmission gap is greater than or equal to the preset duration.

In addition, the present application further provides a multichannel access apparatus, including a processor and a memory. The memory stores program code, and the processor invokes the program code stored in the memory to execute the following operations: obtaining a transmission opportunity TXOP of a reserved channel; sensing a non-reserved channel in the TXOP; and when data transmission is initiated, if there exists a non-reserved channel that is continuously idle in a preset time segment, performing the data transmission by using the reserved channel and the non-reserved channel, where the preset time segment ends at an initiation moment of the data transmission, and duration of the preset time segment is preset duration.

In a specific implementation process, non-reserved channel sensing may be continuously performed in the entire TXOP. Alternatively, non-reserved channel sensing may be performed merely in the preset time segment, that is, the sensing a non-reserved channel in the TXOP is specifically sensing the non-reserved channel in the preset time segment. A person skilled in the art should understand that the preset time segment is in the TXOP. In addition, the initiation moment of the data transmission is an ending moment of a transmission gap after the end of previous data transmission of the data transmission. In a specific implementation process, duration of the transmission gap may be set to be greater than or equal to the preset duration, that is, the duration of the transmission gap is greater than or equal to the preset duration. More specifically, when the previous data transmission is uplink transmission, the duration of the transmission gap is greater than or equal to the preset duration.

The foregoing method and apparatus are described in detail below with reference to specific embodiments. In the following embodiments, the data transmission is specifically embodied as a current data frame. The previous data transmission of the data transmission is specifically embodied as a previous data frame adjacent to the current data frame. The transmission gap between the data transmission and the previous data transmission of the data transmission is specifically embodied as an interframe space. The uplink transmission is specifically embodied as a data frame sent by the foregoing apparatus, that is, a sent data frame. It should be noted that, although in the following embodiment, non-reserved channel sensing occurs merely in the preset time segment, a person skilled in the art should understand that the preset time segment may not be specified; instead, non-reserved channel sensing is performed continuously in the TXOP.

An embodiment of the present application provides a multichannel access method that can resolve the foregoing technical problems. Referring to FIG. 1, the method includes:

S101: Obtain a transmission opportunity TXOP of a first reserved channel.

Specifically, the TXOP (Transmission Opportunity, transmission opportunity) refers to a time interval in which a channel can be used to perform data transmission. The obtaining a transmission opportunity TXOP of a first reserved channel may be: when sensing that the first reserved channel is in an idle state, triggering, by a local device, a backoff procedure, and after the backoff procedure ends, reserving the TXOP of the first reserved channel; or determining, by a peer device, the TXOP of the first reserved channel, and receiving, by a local device, an indication message that is sent by the peer device and that grants the TXOP of the first reserved channel. The indication message that grants the TXOP of the first reserved channel is generally carried by using a control frame or a data frame whose receiving address is an address of the local device, for example, a data frame or an RTS (Request To Send) frame whose receiving address is the address of the local device and that needs to be confirmed or a frame whose RDG (Reverse Direction Grant) field is set to 1. After obtaining the TXOP of the first reserved channel, the local device may receive or send a data frame by using the first reserved channel. A channel contention method of the local device or the peer device may be a channel contention manner such as a DCF (Distributed Coordination Function) or EDCA (Enhance Distributed Channel Access), or may be another method, which is not limited in the present application.

S102: Sense a non-reserved channel other than the first reserved channel in a preset time segment in the TXOP, and if the non-reserved channel is in an idle state, use the non-reserved channel as a second reserved channel.

Specifically, the local device senses a state of a non-reserved channel other than the first reserved channel in the preset time segment prior to a sending moment of a current data frame. An ending moment of the preset time segment is the sending moment of the current data frame. If it is sensed that the non-reserved channel is in an idle state, the non-reserved channel sensed to be in an idle state is used as the second reserved channel. For example, the local device measures a receive power of the non-reserved channel in the preset time segment, determines whether the measured receive power is less than a preset power threshold, and if yes, determines that the non-reserved channel is in an idle state in the preset time segment, or if not, determines that the non-reserved channel is in a busy state in the preset time segment.

It may be understood that the non-reserved channel may include one or multiple channels. The local device senses, in the preset time segment, that one or more non-reserved channels are in an idle state, and uses the one or multiple channels as the second reserved channel.

Optionally, in this embodiment of the present application, a time length of the preset time segment is equal to a PIFS (point coordination function interframe space), a DIFS (distributed coordination function interframe space), an AIFS (arbitration interframe space), or an SIFS (short interframe space).

It should be noted that the current data frame in this embodiment of the present application is a sent frame, that is, a data frame sent by the local device to the peer device. A received frame refers to a data frame sent by the peer device to the local device. The sent frame or the received frame may carry service data or control information. For example, the sent frame or the received frame may be a trigger frame or a response frame. Types of frames are distinguished merely according to uplink and downlink directions of the frames. The local device needs to determine the sending moment of the current data frame. The local device may determine the sending moment of the current data frame according to a sending moment, duration, and an ending moment of a previous frame as well as an interframe space, where the previous frame is prior to and adjacent to the current data frame. In the TXOP, if there is no other data frame before the current data frame, the sending moment of the current data frame may be directly determined according to a moment preset by a system. A data frame prior to and adjacent to the current data frame may be a received frame or a sent frame.

S103: When an ending moment of the preset time segment is reached, send a current data frame on the first reserved channel and the second reserved channel.

Specifically, the ending moment of the preset time segment is the sending moment of the current data frame. When the local device detects that the sending moment of the current data frame is reached, that is, the ending moment of the preset time segment is reached, the local device binds the first reserved channel and the second reserved channel. A channel bandwidth is greatly increased after the binding. The local device sends the current data frame to the peer device by using the first reserved channel and the second reserved channel. In this way, the local device can transmit data by using an idle non-reserved channel, thereby improving channel utilization.

It should be noted that the current data frame may be one frame carried by the first reserved channel and the second reserved channel at the same time, or may be formed by multiple frames separately carried by the first reserved channel and the second reserved channel. The local device and the peer device each may be one station, or may be multiple stations in a multi-user transmission mechanism.

It should be noted that the previous data frame adjacent to the current data frame and the current data frame are transmitted in a same TXOP. Because it is determined in advance that the current data frame is in the TXOP, it is unnecessary to perform contention before sending the current data frame; instead, the current data frame is sent on the first reserved channel or the first reserved channel and the second reserved channel that are bound together.

It may be understood that S102 and S103 may be repeatedly performed. The local device sends the current data frame on the first reserved channel and the second reserved channel, that is, the local device uses the first reserved channel and the second reserved channel as a new first reserved channel. The local device senses, in a preset time segment before a next data frame of the current data frame is sent on the new first reserved channel, whether a non-reserved channel is in an idle state. An ending moment of the preset time segment is a sending moment of the next data frame. If the non-reserved channel is in an idle state, the local device sends a next sent frame by using the non-reserved channel sensed to be in an idle state and the reserved channels (the new first reserved channel). In this way, the local device may constantly extend a bandwidth of a channel before sending a data frame, thereby improving data transmission efficiency.

In implementation of this embodiment of the present application, the local device senses, in the preset time segment before the current data frame is sent on the first reserved channel, whether a non-reserved channel is in an idle state. If yes, the local device uses the non-reserved channel sensed to be in an idle state as a second reserved channel, and sends the current data frame by using the first reserved channel and the second reserved channel. It is implemented that based on some reserved channels, new idle channels are continuously reserved in a data transmission process, and data transmission is performed by using a reserved channel and a newly-reserved idle channel, so that channel usage efficiency is improved, and channel resources are saved.

Optionally, in some embodiments of the present application, before the sensing a non-reserved channel other than the first reserved channel in a preset time segment in the TXOP, the method further includes:

calculating a sending moment of the current data frame in the TXOP, and using the calculated sending moment as an ending moment of the preset time segment.

The determining, by the local device, a sending moment of the current data frame in the TXOP specifically includes: determining the sending moment of the current data frame according to a related parameter of a previous data frame adjacent to the current data frame. Exemplarily, the previous data frame adjacent to the current data frame is a response frame. The local device determines the sending moment of the current data frame according to a sending moment or an ending moment of the response frame, duration of the response frame, and an interframe space between the response frame and the current data frame. The response frame is returned by the peer device according to a previous sent frame sent by the local device. It should be noted that all data frames involved in this embodiment of the present application are in the TXOP. After receiving the response frame, the local device obtains the sending moment or the ending moment of the response frame, determines the duration of the response frame, and the interframe space between the response frame and the current data frame. The local device obtains the sending moment of the current data frame according to the ending moment of the response frame plus the interframe space between the response frame and the current data frame, or the sending moment of the response frame plus the duration of the response frame plus the interframe space between the response frame and the current data frame.

Optionally, in some embodiments of the present application, the access method further includes:

determining whether the interframe space between the current data frame and the previous data frame is less than a time length of the preset time segment, and if yes, adjusting the interframe space between the current data frame and the previous data frame, so that the adjusted interframe space is greater than or equal to the time length of the preset time segment. The foregoing operations are mainly designed for some scenarios. For example, in a scenario, the previous data frame of the current data frame is a data frame sent by the local device. Generally, in a process of sending a data frame, the local device cannot perform a channel sensing operation. Therefore, if the current data frame is sent by the local device, and the previous data frame of the current data frame is also a data frame sent by the local device, to sense the non-reserved channel, the local device needs to at least wait till sending of the previous data frame is finished, that is, an earliest start moment for sensing the non-reserved channel is an ending moment of the sending of the previous data frame. In this case, if the interframe space is less than the time length of the preset time segment, before starting sending the current data frame, a time length for which the local device senses the non-reserved channel cannot reach the time length of the preset time segment. Consequently, the local device cannot fully sense the non-reserved channel. Therefore, a time length of the interframe space between the previous data frame and the current data frame needs to be adjusted to be greater than or equal to the time length of the preset time segment, so that the local device can fully sense the non-reserved channel. In addition, another scenario in which the foregoing operations may be performed is described in detail with reference to FIG. 6.

Optionally, in some embodiments of the present application, the access method further includes:

receiving an indication message sent by the peer device, where the indication message includes a target time length; and adjusting the interframe space between the current data frame and the previous data frame to the target time length according to the indication message, where the target time length is greater than or equal to a time length of the preset time segment.

Referring to FIG. 2 to FIG. 6, FIG. 2 to FIG. 6 are sequence diagrams of a multichannel access method according to an embodiment of the present application. In FIG. 2 to FIG. 6, a data frame is referred to as a sent frame or a received frame according to a transmission direction of the data frame. The sent frame refers to a data frame sent by a local device to a peer device, and the received frame refers to a data frame sent by the peer device to the local device.

Figure 2:
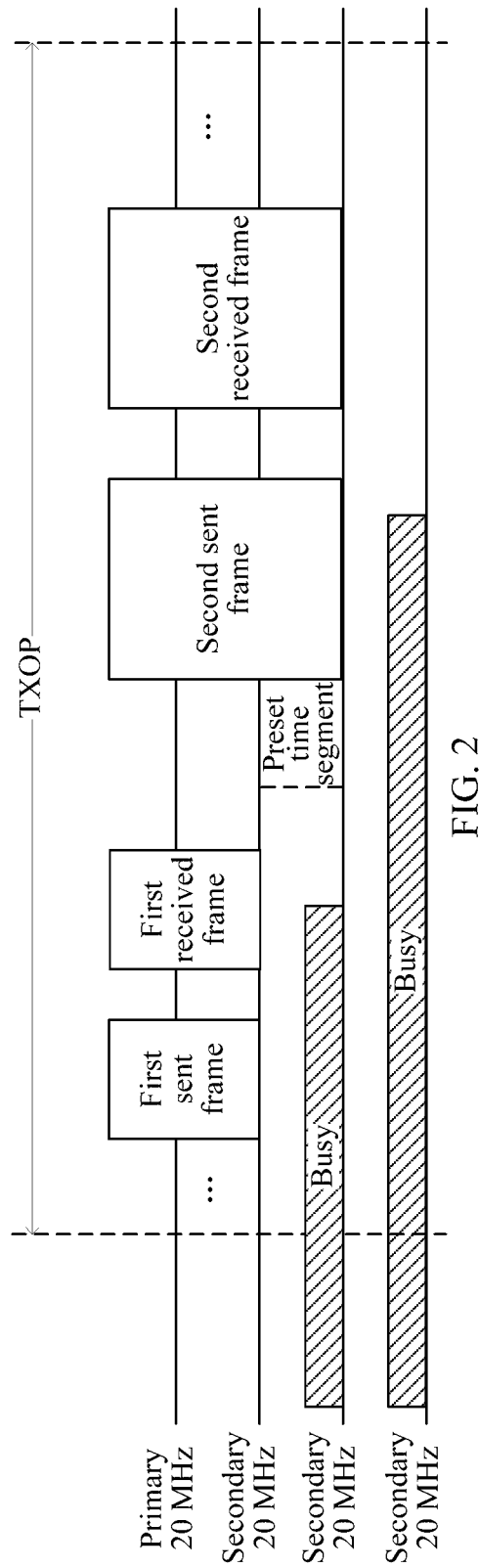
FIG. 2 is a sequence diagram of a multichannel access method according to Embodiment 2 of the present application.

Referring to FIG. 2, FIG. 2 is a sequence diagram of a multichannel access method according to Embodiment 2 of the present application. In this embodiment of the present application, the local device occupies a quantity of channels by means of channel contention, and reserves a transmission opportunity TXOP on the channels. A manner of channel contention may be an existing channel contention manner such as a DCF or EDCA, or may be another channel contention manner, which is not limited in the present application. In this embodiment of the present application, devices for performing data interaction are referred to as a local device and a peer device respectively. The local device and the peer device may be AP (Access Point) stations or non-AP stations. Both the local device and the peer device can transmit a frame. A process involved in this embodiment of the present application is completed in the TXOP.

Exemplarily, it is assumed that four channels are configured between the local device and the peer device, which are respectively a primary 20 Mhz channel, a first secondary 20 MHz channel, a second secondary 20 MHz channel, and a third secondary 20 MHz channel in sequence from top to bottom. A grid with slashes on a channel is used to represent that the channel is in a busy state, and if a channel does not have a grid with slashes, it indicates that the channel is in an idle state. The local device obtains, by means of channel contention, a right to use the primary 20 MHz channel and the first secondary 20 MHz channel, uses the primary 20 MHz channel and the first secondary 20 MHz channel as a first reserved channel, and determines a TXOP (a time segment shown in FIG. 2) of a reserved time on the first reserved channel. The local device sends a first sent frame and receives a first received frame on the first reserved channel. Assuming that a current data frame is a second sent frame, the local device determines a sending moment of the second sent frame. A method for determining the sending moment of the second sent frame may be: determining, by the local device, the sending moment of the second sent frame according to a sending moment and duration of the first received frame, and an interframe space between the first received frame and the second sent frame, where a previous data frame adjacent to the second sent frame is the first received frame; or determining, by the local device, the sending moment of the second sent frame according to an ending moment of the first received frame and an interframe space between the first received frame and the second sent frame.

The local device senses, in a preset time segment prior to the sending moment of the second sent frame, whether a non-reserved channel is in an idle state. Corresponding non-reserved channels in FIG. 2 are a second secondary 20 MHz channel and a third secondary 20 MHz channel. As can be seen from FIG. 2, the second secondary 20 MHz channel is in an idle state in the preset time segment, and the third secondary 20 MHz channel is in a busy state. The local device uses the second secondary 20 MHz channel as a second reserved channel. When the sending moment of the second sent frame is reached, the local device sends the current data frame by using the first reserved channel and the second reserved channel. That is, the local device sends the second sent frame by using the primary 20 MHz channel, the first secondary 20 MHz channel, and the second secondary 20 MHz channel. In this way, it is implemented that based on some reserved channels, a station continuously reserves new idle channels in a data transmission process, and performs data transmission by using a reserved channel and a newly-reserved idle channel, so that channel usage efficiency is improved, and channel resources are saved.

Figure 3:
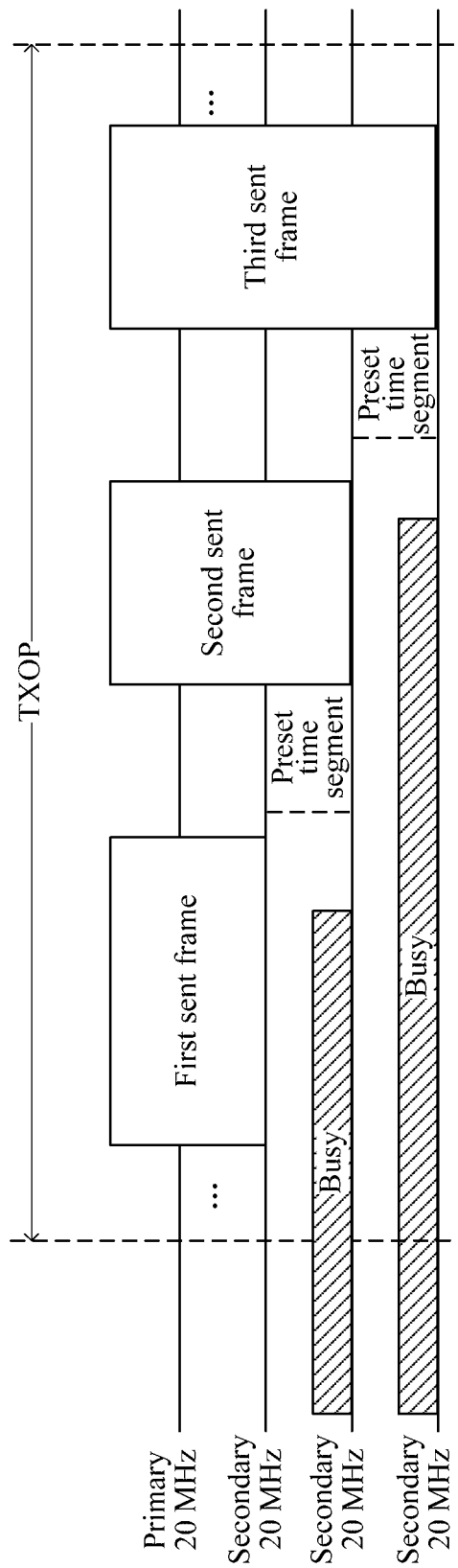
FIG. 3 is a sequence diagram of a multichannel access method according to Embodiment 3 of the present application.

Referring to FIG. 3, FIG. 3 is a sequence diagram of a multichannel access method according to Embodiment 3 of the present application. In this embodiment of the present application, one primary channel and multiple secondary channels are configured between a local device and a peer device. The local device continuously sends multiple data frames to the peer device. One primary 20 MHz channel and three secondary 20 MHz channels are configured between the local device and the peer device shown in FIG. 3, which are respectively a primary 20 MHz channel, a first secondary 20 MHz channel, a second secondary 20 MHz channel, and a third secondary 20 MHz channel in sequence from top to bottom. In an actual application, a bandwidth of each channel may not be limited to 20 MHz. For example, it is stipulated in the IEEE802.11ah Protocol that the bandwidth of each channel is 2 MHz.

As shown in FIG. 3, a grid with slashes on a channel is used to represent that the channel is in a busy state, and if a channel does not have a grid with slashes, it indicates that the channel is in an idle state. The local device uses, by means of contention, the primary 20 MHz channel and the first secondary 20 MHz channel as a first reserved channel. The local device sends a first sent frame on the first reserved channel. A current data frame is a second sent frame. The local device determines a sending moment of the second sent frame, and a determining method may be: determining, by the local device, the sending moment of the second sent frame according to a sending moment of the first sent frame, duration of the first sent frame, and an interframe space between the first sent frame and the second sent frame, where a previous data frame adjacent to the second sent frame is the first sent frame; or determining, by the local device, the sending moment of the second sent frame according to an ending moment of the first sent frame, and an interframe space between the first sent frame and the second sent frame.

A local device senses, in a preset time segment prior to the second sent frame, a state of a non-reserved channel other than the first reserved channel, that is, states of the second secondary 20 MHz channel and the third secondary 20 MHz channel in FIG. 3. An ending moment of the preset time segment is a start moment of the second sent frame. If it is sensed that the second secondary 20 MHz channel is in an idle state, the second secondary 20 MHz channel is used as a second reserved channel. The local device sends the second sent frame by using the first reserved channel and the second reserved channel. The local device determines a sending moment of a next sent frame after the second sent frame, that is, a third sent frame in FIG. 3. The local device senses a state of a non-reserved channel in a preset time segment before a sending moment of the third sent frame. Because the second secondary 20 MHz channel already becomes a part of the reserved channel in channel extension last time, in this case, the state of the third secondary 20 MHz channel is sensed. When it is found that the channel is in an idle state, the local device binds the third secondary 20 MHz channel and the reserved channels (the primary 20 MHz channel, the first secondary 20 MHz channel and the second secondary 20 MHz channel), and the local device sends the third sent frame by using the bound channels.

It should be noted that in a subsequent channel extension process, the local device updates channels included in the reserved channels. In addition, the local device needs to sense a state of a non-reserved channel in the preset time segment before transmitting a sent frame, and binds a non-reserved channel in an idle state and the reserved channels. The local device transmits the sent frame by using the bound channels.

Figure 4:
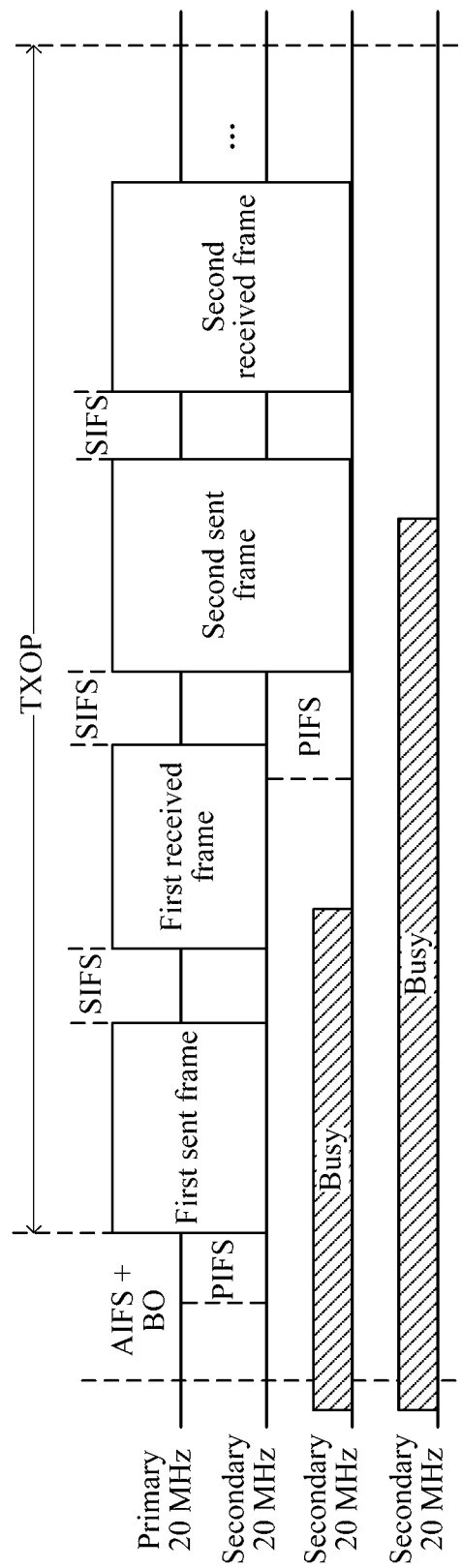
FIG. 4 is a sequence diagram of a multichannel access method according to Embodiment 4 of the present application.

Referring to FIG. 4, FIG. 4 is a sequence diagram of a multichannel access method according to Embodiment 4 of the present application. The multichannel access method in this embodiment of the present application is described below with reference to FIG. 4.

First, a process of reserving a primary 20 MHz channel is briefly described. At the beginning of the reservation process, a local device first measures whether a receive power of the primary 20 MHz channel is less than a preset power threshold, and if yes, determines that the primary 20 MHz channel is in an idle state. If the idle state lasts a period of time (for example, a DIFS), the local device triggers a backoff procedure when the period of time ends, and sets a value of a backoff counter. Subsequently, each time an idle timeslot of the primary 20 MHz channel is detected, the local device decrements the value of the backoff counter by one. If the primary 20 MHz channel enters from an idle state into a busy state, the backoff counter is suspended, and the backoff counter is maintained at a value before the primary 20 MHz channel enters the busy state. When the primary 20 MHz channel enters the idle state again and the idle state lasts for period of time, the backoff counter is restarted from the value before the suspension. After the value of the backoff counter is decreased to 0, the local device obtains a right to use the primary 20 MHZ channel, and determines a TXOP of the primary 20 MHz channel.

The local device senses, in a preset time segment (for example, a PIFS) before the value of the backoff counter is decreased to 0, whether multiple secondary channels associated with a primary channel are in an idle state. If some or all secondary channels are in an idle state in the preset time segment, the local device may bind the primary channel and the idle-state secondary channels, and use the bound channels as a first reserved channel. In FIG. 4, a first secondary 20 MHz channel in the PIFS is in an idle state. The local device uses the primary 20 MHz channel and the first secondary 20 MHz channel as the first reserved channel, and reserves the first reserved channel for a time length of a TXOP.

Exemplarily, the local device triggers a reservation process and senses whether the primary 20 MHz channel is in an idle state. If the primary 20 MHz channel is in an idle state and continues to be idle in a subsequent period of time (for example, a DIFS), the local device sets to trigger a backoff process, and sets the value of the backoff counter to 10. After that, each time an idle timeslot of the primary 20 MHz channel is detected, the local device decrements the value of the backoff counter by one. In a preset time segment before the value of the backoff counter is decreased to 0, assuming that the preset time segment is a PIFS, the local device senses whether three secondary 20 MHz channels are in an idle state in the preset time. In FIG. 4, the first secondary 20 MHz channel is in an idle state in the preset time, and the local device uses the primary 20 MHz channel and the first secondary 20 MHz channel as the first reserved channel. The local device sends a first sent frame on the first reserved channel.

A current data frame in FIG. 4 is a second sent frame. The local device determines a sending moment of the second sent frame. The local device senses, in a PIFS before the sending moment of the second sent frame, whether a non-reserved channel is in an idle state. An ending moment of the PIFS is the sending moment of the second sent frame. The non-reserved channels shown in FIG. 4 are a second secondary 20 MHz channel and a third secondary 20 MHz channel. If the non-reserved channel is in an idle state in the PIFS, the non-reserved channel is used as a second reserved channel. As shown in FIG. 4, the second secondary 20 MHz channel is in an idle state in the PIFS, and the third secondary 20 MHz channel is in a busy state in the PIFS. The local device uses the second secondary 20 MHz channel as the second reserved channel. The local device sends the second sent frame on the first reserved channel and the second reserved channel, that is, the local device sends the current data frame by using the primary 20 MHz channel, the first secondary 20 MHz channel, and the second secondary 20 MHz channel. In this way, it is implemented that based on some reserved channels, a station continuously reserves new idle channels in a data transmission process, and performs data transmission by using a reserved channel and a newly-reserved idle channel, so that channel usage efficiency is improved, and channel resources are saved.

It should be noted that a manner of performing channel extension when the local device senses that a non-reserved channel is in an idle state may be repeated for multiple times. It should be noted that if a non-reserved channel already becomes a reserved channel in a previous channel extension process, the non-reserved channel is used as a part of the first reserved channel in a next channel extension process.

It should be noted that if channel binding of the first reserved channel and the second reserved channel has another constraint condition, the constraint condition also needs to be followed in the channel extension process. For example, if bound channels are required to be continuous, the second reserved channel needs to be adjacent to the first reserved channel. If bound channels merely have several fixed modes such as 20 MHz, 40 MHz, 80 MHz, and 160 MHz (80+80 MHz), the second reserved channel and the first reserved channel need to be bound in accordance with the foregoing modes. Otherwise, even if a non-reserved channel is in an idle state, the non-reserved channel cannot be bound with the first reserved channel.

Figure 5:
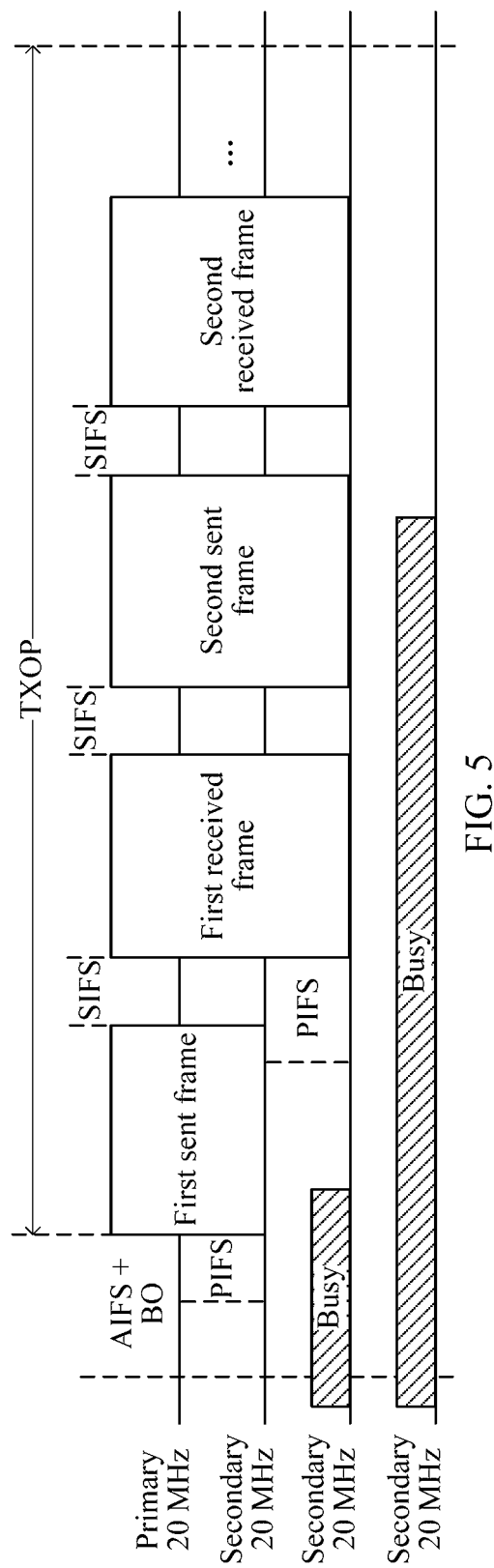
FIG. 5 is a sequence diagram of a multichannel access method according to Embodiment 5 of the present application.

Referring to FIG. 5, FIG. 5 is a sequence diagram of a multichannel access method according to Embodiment 5 of the present application. In this embodiment of the present application, a difference from the foregoing embodiment is that a TXOP of a first reserved channel is determined by a peer device, and a channel extension step is performed by the peer device. The peer device obtains, by means of channel contention, a right to use the first reserved channel, and determines the TXOP of the first reserved channel. The peer device notifies a local device of the TXOP. For a manner in which the peer device determines to contend for the first reserved channel, refer to the description of the foregoing embodiment. Details are not described herein again. The multichannel access method in FIG. 5 is described below:

The peer device obtains, by means of channel contention, the right to use the first reserved channel, and determines the TXOP of the first reserved channel. The peer device notifies the local device of the TXOP of the first reserved channel. The local device sends a first sent frame to the peer device on the first reserved channel. After receiving the first sent frame, the peer device sends a reverse data frame to the local device at a preset sending moment. The reverse data frame sent by the peer device corresponds to a first received frame received by the local device. The peer device senses, in a preset time segment prior to the sending moment at which the peer device sends the reverse data frame to the local device, whether a non-reserved channel is in an idle state. For the local device, a preset time segment prior to a receiving moment of the first received frame corresponds to the preset time segment prior to the sending moment at which the peer device sends the reverse data frame, because sending of the reverse data frame by the peer device corresponds to reception of the first received frame by the local device. If the peer device senses that the non-reserved channel is in an idle state in the preset time segment, the peer device performs mirroring binding on the reserved channel and the non-reserved channel. The peer device sends the reverse data frame to the local device by using a new channel obtained after the binding.

It should be noted that if an interframe space between the first sent frame sent by the local device and the reverse data frame sent by the peer device is less than a preset time length, the peer device may adjust the interframe space, so that the interframe space is greater than or equal to the preset time length, to meet requirements of some scenarios. The adjustment of the interframe space may be performed by the peer device after the peer device receives an indication message of the local device or after the peer device notifies the local device in advance, thereby avoiding that the local device considers mistakenly that the peer device does not successfully send data at a moment of the interframe space before the adjustment.

As can be seen from the foregoing embodiment, both the local device and the peer device may sense the state of the non-reserved channel in the preset time segment before the sent frame is transmitted. If the non-reserved channel is in an idle state, the current reserved channel and the idle-state non-reserved channel are bound. The sent frame is transmitted by using a channel after the binding, so as to improve channel utilization.

It should be noted that a manner of channel extension performed by the peer device by sensing a state of a non-reserved channel may be repeated for multiple times. In a previous channel extension process of the peer device, if a non-reserved channel becomes a reserved channel, the non-reserved channel is used as a part of the reserved channel in a next channel extension process.

It should be noted that manners of channel extension performed by the local device and the peer device by sensing a state of a non-reserved channel may be alternated or repeated for multiple times. Regardless of whether the previous channel extension is performed by the local device or the peer device, if a non-reserved channel becomes a reserved channel in the channel extension process, the non-reserved channel is used as a part of the reserved channel in the next channel extension process.

As can be seen from FIG. 2, FIG. 3, FIG. 4, and FIG. 5, a local device determines a TXOP on a reserved channel by means of channel contention, where the TXOP is used for data transmission to a peer device. In the TXOP, the local device or the peer device performs channel sensing on a non-reserved channel in a preset time segment prior to a sending moment at which a data frame is sent. If the non-reserved channel is in an idle state in the preset time segment, the local device or the peer device may bind the non-reserved channel and the reserved channel to send data.

Figure 6:
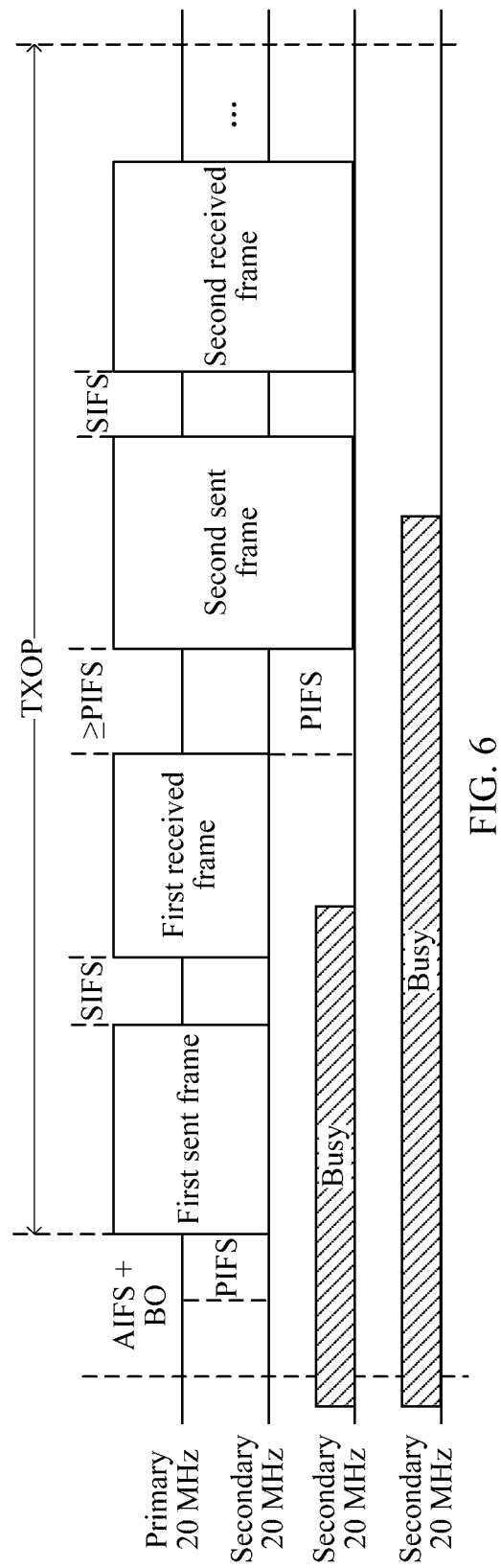
FIG. 6 is a sequence diagram of a multichannel access method according to Embodiment 6 of the present application.

Referring to FIG. 6, FIG. 6 is a sequence diagram of a multichannel access method according to Embodiment 6 of the present application. In a scenario corresponding to the sequence diagram shown in FIG. 6, an interframe space may need to be adjusted. In this embodiment of the present application, duration of a preset time segment is a PIFS, and a current sent frame is a second sent frame. A local device sends a first sent frame by using a first reserved channel. The local device senses a non-reserved channel in the preset time segment before the second sent frame is sent, so as to determine whether the non-reserved channel is in an idle state. In some cases, if an interframe space on the first reserved channel is less than a time length of the preset time segment, a peer device may not have enough time to determine whether the peer device is in an idle state on the non-reserved channel in the preset time segment. Therefore, when replying to the local device on the non-reserved channel, the peer device may cause interference to stations around the peer device. To reduce the interference, which is caused by the peer device on the non-reserved channel, on the stations around the peer device, an interframe space prior to the current data frame on the first reserved channel may be adjusted, so that a time length of the adjusted interframe space is equal to or greater than the time length of the preset time segment. A similar problem also exists in a scenario in which the peer device performs channel extension. When the interframe space before the peer device sends the current data frame is less than the time length of the preset time segment, the local device may not have enough time to determine whether the local device is in an idle state on the non-reserved channel in the preset time segment. Therefore, the interframe space prior to the current data frame needs to be adjusted, so that the time length of the adjusted interframe space is equal to or greater than the time length of the preset time segment.

Before sensing the state of the non-reserved channel, the local device (or the peer device) may determine whether an interframe space between a to-be-sent current data frame (the second sent frame in FIG. 6) on the first reserved channel and a neighboring previous data frame (the first received frame in FIG. 6) is greater than the time length of the preset time segment. Exemplarily, when the interframe space on the first reserved channel is an SIFS, and the duration of the preset time segment is a PIFS, before the local device senses the state of the non-reserved channel in the preset time segment before the second sent frame, if the interframe space between the second sent frame and the first received frame is less than the time length of the preset time segment (that SIFS is less than the PIFS), the interframe space between the second sent frame and the first received frame needs to be adjusted, so that the interframe space is greater than or equal to the PIFS. As shown in FIG. 6, the adjusted interframe space is greater than the SIFS. It should be noted that in sequence diagram shown in FIG. 6, the adjusted interframe space seems to be equal to the PIFS. However, a person skilled in the art should understand that the adjusted interframe space may be greater than the PIFS.

After the local device adjusts the interframe space between the second sent frame and the first received frame, because the peer device does not know the change of the interframe space, the peer device may mistakenly consider that the local device does not send the data frame successfully. To avoid this problem, the local device may indicate, in a previous round of interaction, that the interframe space is to be adjusted; or the local device may adjust the interframe space only after receiving an indication message sent by the peer device.

Specifically, before the local device adjusts the interframe space, the local device sends indication information to the peer device or receives indication information from the peer device. The indication message includes a target time length. The local device or the peer device adjusts a respective interframe space to the target time length according to the indication message.

In the description of the embodiment shown in FIG. 1, a scenario in which the interframe space needs to be adjusted has been described. In this scenario, channel extension is performed by the local device, the current data frame is sent by the local device, and a previous data frame of the current data frame is also sent by the local device. Non-idle channel sensing by the local device needs to be performed in the foregoing preset time segment. The local device cannot sense a channel in a process of sending the previous data frame (assuming that the local device does not have a sending function and a sensing function at the same time). Therefore, if the interframe space between the current data frame and the previous data frame is less than the time length of the preset time segment, the local device does not have enough time to determine the state of the non-reserved channel after sending of the previous data frame is finished. In this case, a time length of the interframe space also needs to be adjusted to be greater than or equal to the time length of the preset time segment.

In fact, in a specific implementation process, in whichever scenario (the scenario in which the interframe space needs to be adjusted described in the embodiment of FIG. 1, and the scenario in which the interframe space needs to be adjusted described in the embodiment of FIG. 6) where an interframe space needs to be adjusted, before the interframe space is adjusted, a party (the local device or the peer device) initiating adjustment of the interframe space needs to notify the other party of the adjusted interframe space, so that the time length of the interframe space is adjusted on both parties (the local device and the peer device). In whichever scenario where an interframe space needs to be adjusted, for a specific method for adjusting the interframe space, refer to method for adjusting the interframe space mentioned in the embodiment shown in FIG. 6.

It should be noted that in an uplink multi-user application scenario such as uplink OFDMA (Orthogonal Frequency Division Multiple Access) or uplink MU MIMO (Multi-User Multiple-Input Multiple-Output), in an uplink process, a station that performs channel extension needs to be clearly indicated; otherwise, collision may be caused if multiple stations simultaneously perform channel extension. In addition, when performing channel extension to adjust an interframe space, a station needs to notify other uplink stations; otherwise, time synchronization among multiple users in the uplink cannot be ensured. In this case, an access point performs coordination. The access point specifies a station in a downlink frame to perform channel extension. When the interframe space needs to be adjusted, in addition to the station that needs to perform channel extension, the access point also needs to instruct other uplink stations to adjust the interframe space, so that all uplink stations simultaneously adjust the interframe space, to achieve time synchronization among multiple stations.

Figure 7:
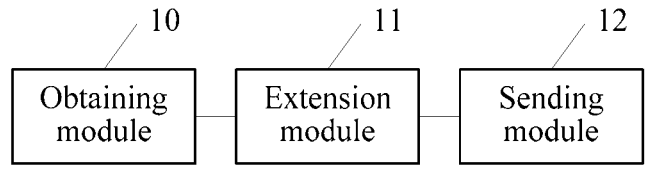
FIG. 7 is a schematic structural diagram of a multichannel access apparatus according to Embodiment 1 of the present application.

Referring to FIG. 7, FIG. 7 is a schematic structural diagram of a multichannel access apparatus according to Embodiment 1 of the present application. In this embodiment of the present application, the access apparatus includes: an obtaining module 10, an extension module 11, and a sending module 12.

The obtaining module 10 is configured to obtain a transmission opportunity TXOP of a first reserved channel.

The extension module 11 is configured to: sense a non-reserved channel other than the first reserved channel in a preset time segment in the TXOP, and if the non-reserved channel is in an idle state, use the non-reserved channel as a second reserved channel.

The sending module 12 is configured to: when an ending moment of the preset time segment is reached, send a current data frame on the first reserved channel and the second reserved channel.

In implementation of this embodiment of the present application, a local device senses, in a preset time segment before sending a current data frame on a first reserved channel, whether a non-reserved channel is in an idle state. If yes, the local device uses the non-reserved channel sensed to be in an idle state as a second reserved channel, and sends the current data frame by using the first reserved channel and the second reserved channel. It is implemented that based on some reserved channels, new idle channels are continuously reserved in a data transmission process, and data transmission is performed by using a reserved channel and a newly-reserved idle channel, so that channel usage efficiency is improved, and channel resources are saved.

Figure 8:
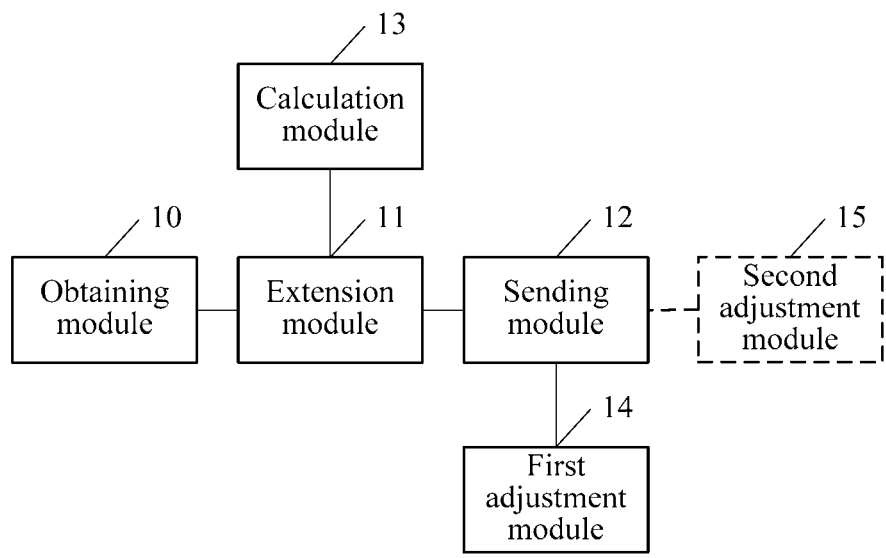
FIG. 8 is a schematic structural diagram of a multichannel access apparatus according to Embodiment 2 of the present application.

Further, referring to FIG. 8, FIG. 8 is a schematic structural diagram of a multichannel access apparatus according to Embodiment 2 of the present application. In addition to the obtaining module 10, the extension module 11, and the sending module 12, the access apparatus further includes: a calculation module 13, a first adjustment module 14/a second adjustment module 15.

The calculation module 13 is configured to: calculate a sending moment of the current data frame in the TXOP, and use the calculated sending moment as the ending moment of the preset time segment.

The first adjustment module 14 is configured to: determine whether the interframe space between the current data frame and the previous data frame is less than a time length of the preset time segment, and if yes, adjust the interframe space between the current data frame and the previous data frame, so that the adjusted interframe space is greater than or equal to the time length of the preset time segment.

The second adjustment module 15 is configured to: receive an indication message sent by the peer device, where the indication message includes a target time length; and adjust the interframe space between the current data frame and the previous data frame to the target time length according to the indication message, where the target time length is greater than or equal to a time length of the preset time segment.

Optionally, the obtaining module 10 is configured to:
when it is sensed that the first reserved channel is in an idle state, trigger a backoff procedure, and after it is detected that the backoff procedure ends, determine the TXOP of the first reserved channel; or
receive the TXOP, which is sent by a peer device, of the first reserved channel, where the TXOP of the first reserved channel is determined by the peer device.

Optionally, the calculation module 13 is configured to:

determine the sending moment of the current data frame according to a start moment of a previous data frame of the current data frame, duration of the previous data frame, and an interframe space between the previous data frame and the current data frame; or determine the sending moment of the current data frame according to an ending moment of a previous data frame of the current data frame, and an interframe space between the previous data frame and the current data frame.

This embodiment of the present application and Method Embodiment 2 to Method Embodiment 6 belong to a same idea, and have same technical effects. For a specific process, refer to descriptions of the foregoing embodiments. Details are not described herein again.

Figure 9:
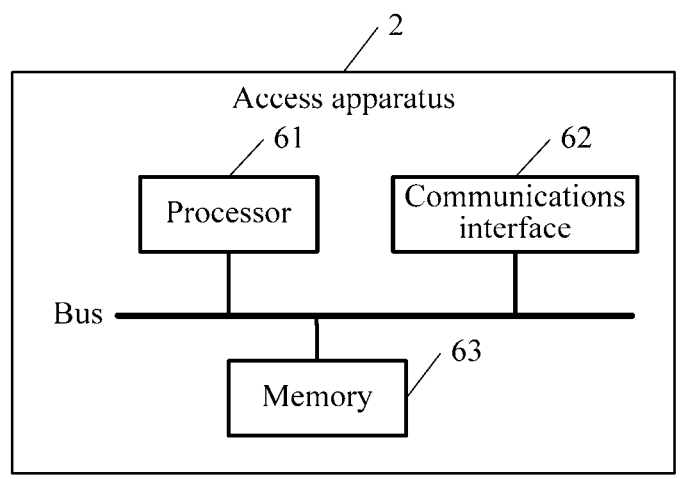
FIG. 9 is a schematic structural diagram of a multichannel access apparatus according to Embodiment 3 of the present application.

Referring to FIG. 9, FIG. 9 is a schematic structural diagram of a multichannel access apparatus according to Embodiment 3 of the present application. In this embodiment of the present application, the access apparatus 2 includes: a processor 61, a memory 62, and a communications interface 63. The communications interface 63 is configured to communicate with an external device. A quantity of the processors 61 in the access apparatus may be one or more. The quantity of the processors 61 in FIG. 9 is 1. In some embodiments of the present application, the processor 61, the memory 62, and the communications interface 63 may be connected to each other by using a bus or in another manner. In FIG. 9, the processor 61, the memory 62, and the communications interface 63 are connected to each other by using a bus. The access apparatus 2 may be configured to execute the method shown in FIG. 1. For terms involved in this embodiment, refer to the embodiment corresponding to FIG. 1. Details are not described herein again.

The memory 62 stores program code. The processor 61 is configured to invoke the program code stored in the memory 62, to execute the following operations:

obtaining a transmission opportunity TXOP of a first reserved channel;

sensing, a non-reserved channel other than the first reserved channel in a preset time segment in the TXOP, and if the non-reserved channel is in an idle state, using the non-reserved channel as a second reserved channel; and when an ending moment of the preset time segment is reached, sending a current data frame on the first reserved channel and the second reserved channel.

In some embodiments of the present application, the obtaining, by the processor 61, a transmission opportunity TXOP of a first reserved channel includes:

when it is sensed that the first reserved channel is in an idle state, triggering a backoff procedure, and after it is detected that the backoff procedure ends, determining the TXOP of the first reserved channel; or receiving the TXOP, which is sent by a peer device, of the first reserved channel, where the TXOP of the first reserved channel is determined by the peer device.

In some embodiments of the present application, the processor 61 is further configured to:

calculate a sending moment of the current data frame in the TXOP, and use the calculated sending moment as an ending moment of the preset time segment.

In some embodiments of the present application, the calculating, by the processor 61, a sending moment of the current data frame in the TXOP includes:

determining the sending moment of the current data frame according to a start moment of a previous data frame of the current data frame, duration of the previous data frame, and an interframe space between the previous data frame and the current data frame; or determining the sending moment of the current data frame according to an ending moment of a previous data frame of the current data frame, and an interframe space between the previous data frame and the current data frame.

In some embodiments of the present application, the processor 61 is further configured to:

determine whether the interframe space between the current data frame and the previous data frame is less than a time length of the preset time segment, and if yes, adjust the interframe space between the current data frame and the previous data frame, so that the adjusted interframe space is greater than or equal to the time length of the preset time segment.

In some embodiments of the present application, the processor 61 is further configured to:

receive an indication message sent by the peer device, where the indication message includes a target time length; and adjust the interframe space between the current data frame and the previous data frame to the target time length according to the indication message, where the target time length is greater than or equal to a time length of the preset time segment.

In some embodiments of the present application, the time length of the preset time segment is equal to a PIFS, a DIFS, an AIFS, or an SIFS.

In implementation of this embodiment of the present application, a local device senses, in a preset time segment before sending a current data frame on a first reserved channel, whether a non-reserved channel is in an idle state. If yes, the local device uses the non-reserved channel sensed to be in an idle state as a second reserved channel, and sends the current data frame by using the first reserved channel and the second reserved channel. It is implemented that based on some reserved channels, new idle channels are continuously reserved in a data transmission process, and data transmission is performed by using a reserved channel and a newly-reserved idle channel, so that channel usage efficiency is improved, and channel resources are saved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What are disclosed above are merely exemplary embodiments of the present application, and certainly are not intended to limit the protection scope of the present application. A person of ordinary skill in the art may understand that all or some of processes that implement the foregoing embodiments and equivalent modifications made in accordance with the claims of the present application shall fall within the scope of the present application.

What is claimed is:

1. A multichannel access method comprising:
reserving one or more channels for transmission of a current data frame;
obtaining a transmission opportunity (TXOP) of a first reserved channel of the one or more reserved channels;
determining a sending moment of the current data frame in the TXOP and using the sending moment as an ending moment of a preset time segment of the TXOP, wherein a time length of the preset time segment is equal to a point coordination function interframe space (PIFS), a distributed coordination function interframe space (DIFS), an arbitration interframe space (AIFS) or a short interframe space (SIFS);

sensing a non-reserved channel that is not among the one or more reserved channels for transmission in the preset time segment in the TXOP;

if the non-reserved channel is in an idle state for at least the preset time segment, using the non-reserved channel as a second reserved channel; and when the ending moment of the preset time segment is reached, sending the current data frame on the first reserved channel and the second reserved channel.

2. The method according to claim 1, wherein obtaining the TXOP of the first reserved channel comprises:

when it is sensed that the first reserved channel is in an idle state, triggering a backoff procedure, and after it is detected that the backoff procedure ends, determining the TXOP of the first reserved channel; or receiving the TXOP, which is sent by a peer device, of the first reserved channel, wherein the TXOP of the first reserved channel is determined by the peer device.

3. A multichannel access apparatus, comprising: a processor and a memory, wherein the memory stores program code, and the processor invokes the program code stored in the memory to execute the following operations:

reserving one or more channels for transmission of a current data frame;

obtaining a transmission opportunity (TXOP) of a first reserved channel of the one or more reserved channels;

determining a sending moment of the current data frame in the TXOP and using the sending moment as an ending moment of a preset time segment of the TXOP, wherein a time length of the preset time segment is equal to a point coordination function interframe space (PIFS), a distributed coordination function interframe space (DIFS), an arbitration interframe space (AIFS) or a short interframe space (SIFS);

sensing a non-reserved channel that is not among the one or more reserved channels for transmission in the preset time segment in the TXOP;

if the non-reserved channel is in an idle state for at least the preset time segment, using the non-reserved channel as a second reserved channel; and when an ending moment of the preset time segment is reached, sending the current data frame on the first reserved channel and the second reserved channel.

4. The apparatus according to claim 3, wherein obtaining, by the processor, the TXOP of the first reserved channel comprises:

when it is sensed that the first reserved channel is in an idle state, triggering a backoff procedure, and after it is detected that the backoff procedure ends, determining the TXOP of the first reserved channel; or receiving the TXOP, which is sent by a peer device, of the first reserved channel, wherein the TXOP of the first reserved channel is determined by the peer device.

5. A multichannel access method comprising:

reserving one or more channels for transmission of a current data frame;

obtaining a transmission opportunity (TXOP) of a reserved channel of the one or more reserved channels;

determining a sending moment of the current data frame in the TXOP and using the sending moment as an ending moment of a preset time segment of the TXOP, wherein a time length of the preset time segment is equal to a point coordination function interframe space (PIFS), a distributed coordination function interframe space (DIFS), an arbitration interframe space (AIFS) or a short interframe space (SIFS);

sensing a non-reserved channel in the TXOP that is not among the one or more reserved channels for transmission; and when data transmission is initiated, if the non-reserved channel is continuously idle in at least the preset time segment, performing the data transmission by using the reserved channel and the non-reserved channel.

6. The method according to claim 5, wherein sensing the non-reserved channel in the TXOP occurs in the preset time segment.

7. A multichannel access apparatus comprising: a processor and a memory, wherein the memory stores program code, and the processor invokes the program code stored in the memory to execute the following operations:

reserving one or more channels for transmission of a current data frame;

obtaining a transmission opportunity (TXOP) of a reserved channel of the one or more reserved channels;

determining a sending moment of the current data frame in the TXOP and using the sending moment as an ending moment of a preset time segment of the TXOP, wherein a time length of the preset time segment is equal to a point coordination function interframe space (PIFS), a distributed coordination function interframe space (DIFS), an arbitration interframe space (AIFS) or a short interframe space (SIFS);

sensing a non-reserved channel in the TXOP that is not among the one or more reserved channels for transmission; and when data transmission is initiated, if the non-reserved channel is continuously idle in at least the preset time segment, performing the data transmission by using the reserved channel and the non-reserved channel.

8. The apparatus according to claim 7, wherein sensing the non-reserved channel in the TXOP occurs in the preset time segment.

* * * * *